United States Patent Office 2,879,248
Patented Mar. 24, 1959

2,879,248

METHOD OF MAKING COPOLYMER OF DIISOCYANATE MODIFIED POLYESTER AND VINYLIDENE MONOMER

Günther Nischk, Leverkusen, Karl E. Müller, Leverkusen-Bayerwerk, and Leonhard Goerden, Oedt, Germany, assignors to Farbenfabriken Bayer Aktiengesellschaft, Leverkusen, Germany, a corporation of Germany No Drawing. Application April 13, 1955
Serial No. 501,186

Claims priority, application Germany April 13, 1954

11 Claims. (Cl. 260—45.4)

This invention relates to novel copolymers and to a process for preparing the same.

The copolymerization of unsaturated polyesters with vinyl or allyl compounds is well known. The unsaturated polyesters used for this copolymerization process are obtained by condensing unsaturated dicarboxylic acids with glycols. The unsaturated dicarboxylic acid can, for example, be maleic acid or fumaric acid. The properties of the copolymers can be varied within wide limits by the presence of adipic acid, phthalic acid, succinic acid and the like organic acids, which usually can be used concurrently in the condensation. The most important glycols are ethylene glycol, diethylene glycol and 1,3-butylene glycol.

The unsaturated polyesters produced in this manner are mixed with unsaturated compounds such as vinyl and allyl compounds, especially styrene or phthalic acid diallyl ester, and copolymerized in the presence of catalysts, such as peroxides.

These copolymers are, however, unstable to the action of water, especially at elevated temperature, so that their mechanical properties are substantially reduced after a few days. This reduction in strength is particularly apparent in the decrease in the bending strength, which is reduced to about one third of its original value, for example, after the copolymer has been stored in water for 30 days at elevated temperature.

It has now been found that these disadvantages can be eliminated, while at the same time the other mechanical advantages can be retained, if an unsaturated linear polyester carrying hydroxyl groups is reacted with an amount of an aromatic or aliphatic diisocyanate such that free hydroxyl groups are still present after the reaction with the polyester, and the addition product obtained is then mixed with a vinyl or allyl compounds and the copolymerizable solutions which are thus obtained, and which are free from isocyanate groups, are then subjected to a polymerization process.

For this purpose there are employed linear unsaturated polyesters containing hydroxyl groups which are obtained in known manner from dicarboxylic acids and glycols by thermal condensation at 150°–220° C. The ratio of the components is chosen, so that the OH number of the resulting polyester ranges between 30 and 400 and the acid number is within the range of 0 to 50. Suitable unsaturated acids for preparing the linear unsaturated polyesters are maleic and fumaric acid; examples of other organic acids, which may concurrently be used in the preparation of the polyesters are adipic acid, phthalic acid, succinic acid, tetrachlorophthalic acid and endomethylene hexachlorotetrahydrophthalic acid. The ratio of the unsaturated to the saturated acids may vary within wide limits. Thus, the quantity of the unsaturated acids may amount to 5–100%, based on the weight of the mixture of acids. Suitable glycols are for instance ethylene glycol, diethylene glycol, 1,3-butylene glycol and 1,2-propylene glycol.

In accordance with the present invention the polyesters are reacted with diisocyanates at temperatures of 60°–140° C., preferably 90°–125° C., a lengthening of the polyester chains by way of urethane groups taking place. The reaction between the unsaturated polyester and the diisocyanate is preferably carried out in the presence of a retarding agent which will suppress a premature polymerization of the unsaturated polyester. As retarding agent, there may be used quinhydrone in an amount of 0.01–0.1% by weight, based on the weight of the polyester employed. The diisocyanate component is employed in a quantity of 40–80%, based on the amount required for reacting with the free OH groups of the polyester. It has proved to be advantageous in this reaction for the diisocyanates to be used in amounts such that free hydroxyl groups are still present after the reaction with the unsaturated polyesters; for when an amount of the diisocyanate which is equivalent to the hydroxyl groups is used, the polyester-vinyl mixtures become too highly viscous. So it is not possible for molded elements to be cast freely in a satisfactory manner.

Suitable diisocyanates for the process of the invention are aliphatic, cycloaliphatic and aromatic diisocyanates. Hexamethylene diisocyanate, hexahydro-p-phenylene diisocyanate, toluylene diisocyanate and 1,4-diphenylmethane diisocyanate have proved to be particularly useful.

The use of polyester diisocyanate adducts with free hydroxyl groups has the advantage that it is not necessary to exclude water carefully during the reaction, whereas when free isocyanate groups are present, these isocyanate groups are readily converted by the action of water into ureas, carbon dioxide being formed. This would result in a cellular molded element. Furthermore, it is possible to use polyesters which contain free carboxyl groups. In the presence of free isocyanate groups, such polyesters containing free carboxyl groups would be disadvantageous, since isocyanate groups react with carboxyl groups, also with the formation of carbon dioxide, to give a product having the above-mentioned disadvantage, i.e. a cellular structure.

The polyester molecules lengthened with isocyanate are mixed with vinyl or allyl compounds and copolymerized with the aid of polymerization accelerators such as peroxide. Examples of suitable ethylenically unsaturated compounds are vinyl or allyl compounds such as, for example, styrene, divinyl benzene, acrylic and methacrylic acid esters, and also phthalic acid diallyl ester. The proportion of the vinyl compound shall be 10–100%, based on the isocyanate modified polyester.

The copolymerization can be carried out in molds and also with the reactants in the form of a thin layer of lacquer. The mechanical properties of the product are substantially better than those of copolymers which are produced from the previously known unmodified unsaturated polyesters and vinyl compounds. The resistance to water is also excellent.

Bending strength after storing in water at 80° C. for 30 days:

|  | Kg./cm.$^2$ |
|---|---|
| Sample according to Example 1 | 600 |
| Sample according to Example 2 | 650 |
| Sample according to Example 3 | 700 |
| Sample prepared without using diisocyanate | 150 |

*Example 1*

392 parts of maleic acid anhydride, 592 parts of phthalic acid anhydride, 424 parts of diglycol and 328 parts of glycol are gradually heated with stirring to 210° C. in a stream of nitrogen. Above 160° C., esterification takes place and water is split off. When the temperature of the stream of nitrogen-water mixture has dropped to 85° C., the pressure is slowly reduced, so as to give a pressure of 20 mm. after approximately two hours. The mixture is then heated for a further 7 hours at 210° C. The acid number is then 20 and the hydroxyl number is 85.

400 parts of this polyester are heated to 100° C. while stirring and thereafter mixed with 27 parts of toluylene diisocyanate (50% of the theoretical amount, calculated on hydroxyl terminal groups) and 0.08 part of quinhydrone. The temperature rises to 110° C. The mixture is kept for another 50 minutes at this temperature, 0.2 part of hydroquinone is added and the mixture stirred for a further 10 minutes. 185 parts of styrene are then added.

Copolymerization with 1% benzoyl peroxide produces a test member with the following properties:

Impact resistance _____ 23.8 kg./cm.²; Vicat degree, 183° C.
Bending strength _____ 1058 kg./cm.²; (test member sprung).
Bending angle _____ 18°; Brinell hardness: 10″, 1508; 60″, 1440.

*Example 2*

400 parts of the polyester described in Example 1 are mixed at 100° C. with 36 parts of toluylene diisocyanate and 0.08 part of quinhydrone. The temperature rises to 112° C. After stirring for 50 minutes in a nitrogen atmosphere, 0.2 part of hydroquinone is added. After a further 10 minutes, 185 parts of styrene are run in and the mixture is stirred until dissolution is complete. The copolymerization takes place at 100° C. with 1% benzoyl peroxide.

Mechanical values:
  Impact resistance _____ 25.5 kg./cm.²; Vicat degree, above 250° C.
  Bending strength _____ 1766 kg./cm.².
  Bending angle _____ 19°; Brinell hardness, 10″, 1545; 60″, 1480.

*Example 3*

400 parts of the unsaturated polyester described in Example 1 are heated to 100° C. and mixed with 41 parts of toluylene diisocyanate (75% of the theoretical amounts, calculated on the terminal hydroxyl groups of the polyester) and 0.08 part of quinhydrone. The mixture is thereafter worked up as described in Example 2. The amount of hydroquinone added is 0.2 part, while 190 parts of styrene are added. The copolymerization takes place with 1% benzoyl peroxide at 100° C. The test tnumber has the following properties:

Impact resistance _____ 27.9 kg./cm.²; Vicat degree, 210° C.
Bending strength _____ 1750 kg./cm.² (test member sprung).
Bending angle _____ 22°; Brinell hardness, 10″, 1500; 60″, 1432.

*Example 4*

400 parts of the unsaturated polyester described in Example 1 are heated to 120° C. and reacted with 39.5 parts of hexamethylene diisocyanate; 0.3 part of quinhydrone is added as polymerization stabilizer. After heating to 120° C. for 30 minutes, 300 parts of diallyl phthalate are introduced with stirring and the mixture is polymerized with 1% of benzoyl peroxide at 100° C. The copolymer thus obtained is almost colorless and clear as glass.

*Example 5*

400 parts of an unsaturated polyester, which was prepared from 1 mol of phthalic acid, 0.5 mol of adipic acid, 1.5 mols of maleic acid and 3.1 mols of 1,3-butanediol by thermal condensation and which has the acid number 10 and the OH number 112, are reacted with 66.5 parts of hexahydro-p-phenylene diisocyanate and 0.4 part of quinhydrone and kept at 120° C. for 30 minutes. Thereupon 150 parts of styrene and 150 parts of methyl methacrylate are introduced with stirring and copolymerization is effected at room temperature by addition of 12 parts of cyclohexanone hydroperoxide and 2.5 parts of cobalt naphthenate. Hardening is completed by heating to 120° C. for 60 minutes. The copolymer obtained is clear as glass and weakly rose-colored.

*Example 6*

400 parts of the unsaturated polyester of Example 5 are heated with 75 parts of diphenylmethane diisocyanate in the presence of 0.4 part of quinhydrone to 110° C. for 45 minutes. After the chains have increased in length, the reaction product is mixed with 250 parts of butyl methacrylate and 100 parts of diallyl phthalate and polymerized with 12 parts of butyl permaleinate and 2.5 parts of the dicyclohexylamine salt of p-toluylenesulfonic acid at room temperature. The copolymer obtained is clear as glass.

We claim:

1. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from 0 to 50 with an organic diisocyanate, said organic diisocyanate being in an amount of about 40 percent to about 80 percent of the theoretical amount required to react with all the hydroxyl groups of said polyester, and thereafter heating the resulting addition product having unreacted hydroxyl groups with from about 10 percent to about 100 percent, based on the weight of said addition product, of a monomeric compound containing at least one radical having the formula $$CH_2{=}\overset{R}{C}{-}$$

wherein R is selected from the group consisting of hydrogen and a methyl group.

2. The method of claim 1 wherein the reaction of an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50 with an organic diisocyanate is carried out in the presence of from about 0.01 percent to about 0.1 percent of quinhydrone based on the weight of the polyester.

3. A method for making nonporous polymers which comprises reacting an hydroxyl terminated polyester obtained by the esterification of dicarboxylic acids containing from about 5 percent to about 100 percent ethylenically unsaturated dicarboxylic acids and a dihydric alcohol, said polyester having an hydroxyl number of from about 30 to about 400 and an acid number of from about 0 to 50 with an organic diisocyanate at from about 60° C. to about 120° C. in the presence of from about 0.01 percent to about 0.1 percent of quinhydrone based on the weight of the polyester, said organic diisocyanate being in an amount of about 40 percent to about 80 percent of the theoretical amount required to react with all the hydroxyl groups of said polyester, and thereafter heating in the presence of an organic peroxide the resulting addition product with from about 10 percent to about 100 percent, based on the weight of said addition product, of a monomeric compound having the radical $$CH_2{=}\overset{R}{C}{-}$$

wherein R is selected from the group consisting of hydrogen and a methyl group.

4. A method for making nonporous polymers which comprises reacting an hydroxyl terminated polyester obtained by the esterification of dicarboxylic acids containing from about 5 percent to about 100 percent ethylenically unsaturated dicarboxylic acids and a dihydric alcohol, said polyester having an hydroxyl number of from about 30 to about 400 and an acid number of from about 0 to 50 with toluylene diisocyanate at from about 90° C. to about 130° C. in the presence of from about 0.01 percent to about 0.1 percent of quinhydrone, based on the weight of the polyester, said toluylene diisocyanate being in an amount of from about 40 percent to about 80 percent of the theoretical amount required to react with all the hydroxyl groups of said polyester, and thereafter heating in the presence of an organic peroxide the resulting addition porduct with from about 10 percent to about 100 percent of styrene, based on the weight of said addition product, to effect polymerization.

5. A method for making nonporous polymers which comprises reacting an hydroxyl terminated polyester obtained by the esterification of dicarboxylic acids containing from about 5 percent to about 100 percent ethylenically unsaturated dicarboxylic acids and a dihydric alcohol, said polyester having an hydroxyl number of from about 30 to about 400 and an acid number of from about 0 to 50 with hexamethylene diisocyanate at from about 90° C. to about 130° C. in the presence of from about 0.01 percent to about 0.1 percent of quinhydrone, based on the weight of the polyester, said hexamethylene diisocyanate being in an amount of from about 40 percent to about 80 percent of the theoretical amount required to react with all the hydroxyl groups of said polyester, and thereafter heating in the presence of an organic peroxide the resulting addition product with from about 10 percent to about 100 percent of diallyphthalate, based on the weight of said addition product, to effect polymerization.

6. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50 with hexahydro-p-phenylene diisocyanate at from about 90° C. to about 130° C. in the presence of from about 0.01 percent to about 0.1 percent of quinhydrone, based on the weight of the polyester, said hexahydro-p-phenylene diisocyanate being in an amount of about 40 percent to about 80 percent of the theoretical amount required to react with all the hydroxyl groups of said polyester, and thereafter heating in the presence of an organic peroxide the resulting addition product with from about 10 percent to about 100 percent of a mixture of styrene and methyl methacrylate, based on the weight of said addition product, to effect polymerization.

7. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50 with diphenylmethane diisocyanate at from about 90° C. to about 130° C. in the presence of from about 0.01 percent to about 0.1 percent of quinhydrone based on the weight of the polyester, said diphenylmethane diisocyanate being in an amount of about 40 percent to about 80 percent of the theoretical amount required to react with all the hydroxyl groups of said polyester, and thereafter heating in the presence of an organic peroxide the resulting addition product with from about 10 percent to about 100 percent of a mixture of butyl methacrylate and diallylphthalate, based on the weight of said addition product, to effect polymerization.

8. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50; said polyester having been prepared from maleic anhydride, phthalic anhydride, diethylene glycol and ethylene glycol; with toluylene diisocyanate at from about 90° C. to about 130° C. in the presence of from about 0.01 percent to about 0.1 percent of quinhydrone based on the weight of the polyester, said toluylene diisocyanate being in an amount of from about 40 percent to about 80 percent of the theoretical amount required to react with all the hydroxyl groups of said polyester, and thereafter heating in the presence of an organic peroxide the resulting addition product with from about 10 percent to about 100 percent styrene, based on the weight of said addition product, to effect polymerization.

9. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50, said polyester having been prepared from maleic anhydride, phthalic anhydride, diethylene glycol and ethylene glycol with hexamethylene diisocyanate at from about 90° C. to about 130° C. in the presence of from about 0.01 percent to about 0.1 percent of quinhydrone based on the weight of the polyester, said hexamethylene diisocyanate being in an amount of from about 40 percent to about 80 percent of the theoretical amount required to react with all the hydroxyl groups of said polyester, and thereafter heating in the presence of an organic peroxide the resulting addition product with from about 10 percent to about 100 percent of diallylphthalate, based on the weight of said addition product, to effect polymerization.

10. A method for making nonporous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50 with hexahydro-p-phenylene diisocyanate at from about 90° C. to about 130° C. in the presence of from about 0.01 percent to about 0.1 percent of quinhydrone based on the weight of the polyester, said hexahydro-p-phenylene diisocyanate being in an amount of from about 40 percent to about 80 percent of the theoretical amount required to react with all the hydroxyl groups of said polyester and thereafter heating in the presence of an organic peroxide the resulting addition product with from about 10 percent to about 100 percent of a mixture of styrene and methyl methacrylate, based on the weight of said addition product, to effect polymerization.

11. A method for making non-porous polymers which comprises reacting an hydroxyl terminated polyester obtained by the esterification of dicarboxylic acid containing from about 5 percent to about 100 percent ethylenically unsaturated dicarboxylic acids and a dihydric alcohol, said polyester having an hydroxyl number of from about 30 to about 400 and an acid number of from about 0 to 50, said polyester having been prepared from phthalic acid, adipic acid, maleic acid and butanediol, with diphenylmethane diisocyanate at from about 90° C. to about 130° C. in the presence of from about 0.01 to about 0.1 percent of quinhydrone based on the weight of the polyester, said diphenylmethane diisocyanate being in an amount of from about 40 percent to about 80 percent of the theoretical amount required to react with all the hydroxyl groups of said polyester, and thereafter heating in the presence of an organic peroxide the resulting addition product with from about 10 percent to about 100 percent of the mixture of butyl methacrylate and diallylphthalate, based on the weight of said addition product, to effect polymerization.

References Cited in the file of this patent

UNITED STATES PATENTS

| | | |
|---|---|---|
| 2,503,209 | Nyquist et al. | Apr. 4, 1950 |
| 2,591,884 | Simon et al. | Apr. 8, 1952 |
| 2,639,252 | Simon et al. | May 19, 1953 |
| 2,780,613 | Rubens | Feb. 5, 1957 |

OTHER REFERENCES

"Organic Chemistry" (Karrer), published by Nordeman Publishing Co. Inc. (1938); pages 339–340 relied on.

"Organic Chemistry" (Fieser and Fieser), 2nd edition, published by Reinhold Publishing Corp. (1950); pages 550–561 relied on.